United States Patent
Luo

(10) Patent No.: US 11,805,198 B2
(45) Date of Patent: *Oct. 31, 2023

(54) UNREAD-MESSAGE REMINDING METHOD, TERMINAL DEVICE AND STORAGE MEDIUM

(71) Applicant: BEIJING BYTEDANCE NETWORK TECHNOLOGY CO., LTD., Beijing (CN)

(72) Inventor: Zhenxing Luo, Beijing (CN)

(73) Assignee: BEIJING BYTEDANCE NETWORK TECHNOLOGY CO., LTD., Beijing (CN)

( * ) Notice: Subject to any disclaimer, the term of this patent is extended or adjusted under 35 U.S.C. 154(b) by 0 days.

This patent is subject to a terminal disclaimer.

(21) Appl. No.: 17/932,647

(22) Filed: Sep. 15, 2022

(65) Prior Publication Data

US 2023/0012233 A1    Jan. 12, 2023

Related U.S. Application Data

(63) Continuation of application No. 17/536,811, filed on Nov. 29, 2021, now Pat. No. 11,457,107, which is a (Continued)

(30) Foreign Application Priority Data

May 31, 2019 (CN) .......................... 201910471578.8

(51) Int. Cl.
*H04M 1/00* (2006.01)
*H04M 1/72436* (2021.01)
(Continued)

(52) U.S. Cl.
CPC .... *H04M 1/72436* (2021.01); *G06F 3/04817* (2013.01); *H04L 51/04* (2013.01); (Continued)

(58) Field of Classification Search
CPC ........ H04M 1/72436; H04M 1/72469; H04M 2201/42; H04L 51/234; H04L 51/04; G06F 3/04817

See application file for complete search history.

(56) References Cited

U.S. PATENT DOCUMENTS 11,134,048 B2 * 9/2021 Chen .................. H04L 51/42
11,134,084 B1 * 9/2021 Koh .................... B63C 11/30
(Continued)

FOREIGN PATENT DOCUMENTS

CN           102447647 A      5/2012
CN           104166717 A  * 11/2014    ........... G06F 9/4443
(Continued)

OTHER PUBLICATIONS

Chinese Patent Application No. 201910471578.8, First Search Report, 2 pages.
(Continued)

*Primary Examiner* — Khai M Nguyen

(57) ABSTRACT

Provided are an unread-message reminding method and apparatus, a terminal device and a storage medium. The method includes displaying, in response to receiving an activation instruction of a session interface and in a case where an unread message is present on the session interface, an unread-message reminder icon on the session interface; skipping, in response to receiving a trigger instruction of the unread-message reminder icon, to a corresponding unread message for a user to read; and updating, in real time and according to a session message received by the session interface in real time and an unread-message reading state, the unread-message reminder icon displayed on the session interface.

17 Claims, 7 Drawing Sheets

Display, on a session interface, at least one of the icon for viewing of the first unread message, the icon for viewing of the last unread message or the icon for displaying the real-time total number of unread messages in response to receiving an activation instruction of the session interface and in the case where an unread message is present on the session interface — 510

Skip to the first unread message in response to receiving the trigger instruction of the icon for viewing of the first unread message; or skip to the last unread message in response to receiving the trigger instruction of the icon for viewing of the last unread message — 520

Update, in real time and according to a session message received by the session interface in real time and an unread-message reading state, the unread-message reminder icon on the session interface — 530

Related U.S. Application Data continuation of application No. PCT/CN2020/091057, filed on May 19, 2020.

(51) Int. Cl.
*H04M 1/72469* (2021.01)
*G06F 3/04817* (2022.01)
*H04L 51/04* (2022.01)
*H04L 51/234* (2022.01)

(52) U.S. Cl.
CPC ...... *H04L 51/234* (2022.05); *H04M 1/72469* (2021.01); *H04M 2201/42* (2013.01)

(56) References Cited

U.S. PATENT DOCUMENTS

| | | |
|---|---|---|
| 2004/0172456 A1 | 9/2004 | Green et al. |
| 2004/0248598 A1 | 12/2004 | Ding et al. |
| 2008/0033256 A1 | 2/2008 | Farhan et al. |
| 2012/0317498 A1* | 12/2012 | Logan ................... H04L 51/224 715/752 |
| 2018/0109670 A1 | 4/2018 | Prado et al. |
| 2018/0270183 A1* | 9/2018 | Wei ....................... H04L 51/046 |
| 2018/0331996 A1* | 11/2018 | Zhang ................... H04L 51/234 |
| 2019/0155459 A1* | 5/2019 | Chen ..................... G06F 3/0482 |
| 2021/0250311 A1* | 8/2021 | Luo ...................... G06F 3/04817 |

FOREIGN PATENT DOCUMENTS

| | | | | |
|---|---|---|---|---|
| CN | 105573607 A | * | 5/2016 | |
| CN | 105607883 A | | 5/2016 | |
| CN | 106100969 A | | 11/2016 | |
| CN | 109725947 A | | 5/2019 | |
| CN | 109799938 A | | 5/2019 | |
| CN | 110119276 A | * | 8/2019 | |
| CN | 110191231 A | | 8/2019 | |
| CN | 110209323 A | * | 9/2019 | |
| EP | 2804349 A1 | | 11/2014 | |
| JP | 2007129506 A | | 5/2007 | |
| WO | WO-9740477 A1 | * | 10/1997 | ............ G08B 5/227 |
| WO | WO03/041025 A1 | | 5/2003 | |
| WO | WO2018169810 A1 | | 9/2018 | |

OTHER PUBLICATIONS

Chinese Patent Application No. 201910471578.8, First Office Action, 15 pages with English Translation.
Chinese Patent Application No. 201910471578.8, Second Office Action dated Dec. 17, 2020, 18 pages with English Translation.
Chinese Patent Application No. 201910471578.8, Third Office Action dated May 28, 2021, 18 pages with English Translation.
International Application No. PCT/CN2020/091057, International Search Report dated Aug. 5, 2020, 4 pages with English Translation.
Extended European Search Report dated May 18, 2022 in European Patent Application No. 20815007.8.
Notice of Reasons for Refusal dated Dec. 1, 2022 in Japanese Patent Application No. 2021-570751, with English translation (10 pages).

* cited by examiner

UNREAD-MESSAGE REMINDING METHOD, TERMINAL DEVICE AND STORAGE MEDIUM

CROSS REFERENCE TO RELATED APPLICATIONS

This is a continuation of U.S. patent applicant Ser. No. 17/536,811, filed on Nov. 29, 2021, which is a continuation of International Patent Application No. PCT/CN2020/091057, filed on May 19, 2020, which is based on and claims priority to Chinese Patent Application No. 201910471578.8 filed with the CNIPA on May 31, 2019, disclosures of which are incorporated herein by reference in their entireties.

TECHNICAL FIELD

Embodiments of the present disclosure relate to instant messaging, for example, an unread-message reminding method and apparatus, a terminal device and a storage medium.

BACKGROUND

With the rapid development of Internet technology, various instant messaging products emerge constantly, greatly enriching social contact and entertainment of users and facilitating organization and management of employees by enterprises. Instant messaging products are favored by a large number of users and enterprises because the users and enterprises have the convenience of using an instant messaging product to initiate a session anytime and anywhere.

An individual-to-individual chat session and a group chat session between multiple users can both be implemented by using an instant messaging product. A user of an instant messaging product cannot be online all the time and thus cannot always read a message once receiving the message. As a result, usually unread messages accumulate and are read when the user is free.

In the related art, one solution to the problem is that a user about the number of unread messages is reminded and then the first unread message is skipped to and, meanwhile, the unread-message reminder icon disappears, when the user taps an unread-message reminder icon. Then the user can read the unread messages by sliding the screen. In practice, however, a user is likely to fail to read all the currently unread messages. This is because the user tends to read only part of the unread messages when a matter of urgency occurs, but later the system does not remind the position of the currently remaining unread messages. Consequently, the user has to look for the first unread message by relying on the memory and sliding the screen himself.

SUMMARY

Embodiments of the present disclosure provide an unread-message reminding method and apparatus, a terminal device and a storage medium for the purpose of reminding about an unread message.

An embodiment of the present disclosure provides an unread-message reminding method. The method includes displaying a session interface, and displaying an unread-message reminder icon on the session interface in a case where a plurality of unread messages are present on the session interface, where the unread messages include a set type of unread messages; skipping, in response to receiving a trigger instruction of the unread-message reminder icon, to a corresponding unread message for a user to read, where the unread-message reminder icon does not disappear; and positioning remaining unread messages through the unread-message reminder icon according to a unread-message reading state.

An embodiment of the present disclosure provides a terminal device. The device includes one or more processing apparatuses and a storage apparatus storing one or more programs.

The one or more programs, when executed by the one or more processing apparatuses, cause the one or more processing apparatuses to perform the unread-message reminding method of any one of embodiments of the present disclosure.

An embodiment of the present disclosure provides a computer-readable storage medium. The storage medium stores a computer program which, when executed by a processing apparatus, causes the processing apparatus to perform the unread-message reminding method of any one of embodiments of the present disclosure.

DETAILED DESCRIPTION

Figure 1:
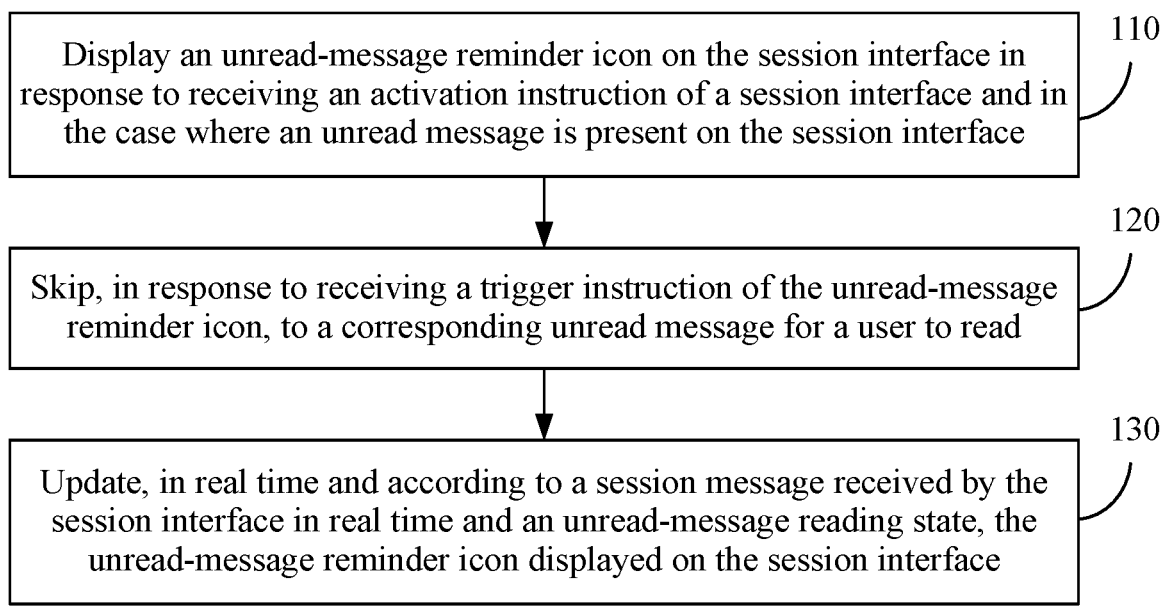
FIG. 1 is a flowchart of an unread-message reminding method according to embodiment one of the present disclosure.

The present disclosure is further described below in conjunction with drawings and embodiments. It is to be understood that the embodiments described herein are intended to illustrate and not to limit the present disclosure. It is to be noted that for ease of description, only part, not all, of structures related to the present disclosure are illustrated in the drawings.

Optional features and examples are described in each of the embodiments described below. Multiple optional features described in these embodiments may be combined into multiple optional solutions. Each numbered embodiment is not regarded as only one solution.

Embodiment One

FIG. 1 is a flowchart of an unread-message reminding method according to embodiment one of the present disclosure. The method is applicable to reminding about a message not viewed by a user in an instant messaging application and automatically skipping to the unread message when the user taps an unread-message reminder icon. The method improves the efficiency of reading the unread message by the user and improves the user experience. The method may be performed by an unread-message reminding apparatus. The apparatus may be implemented as software and/or hardware and typically integrated in a terminal such as a mobile phone or a computer. Referring to FIG. 1, the unread-message reminding method includes the steps below.

In step 110, an unread-message reminder icon is displayed on the session interface in response to receiving an activation instruction of a session interface and in the case where an unread message is present on the session interface.

Figure 2:
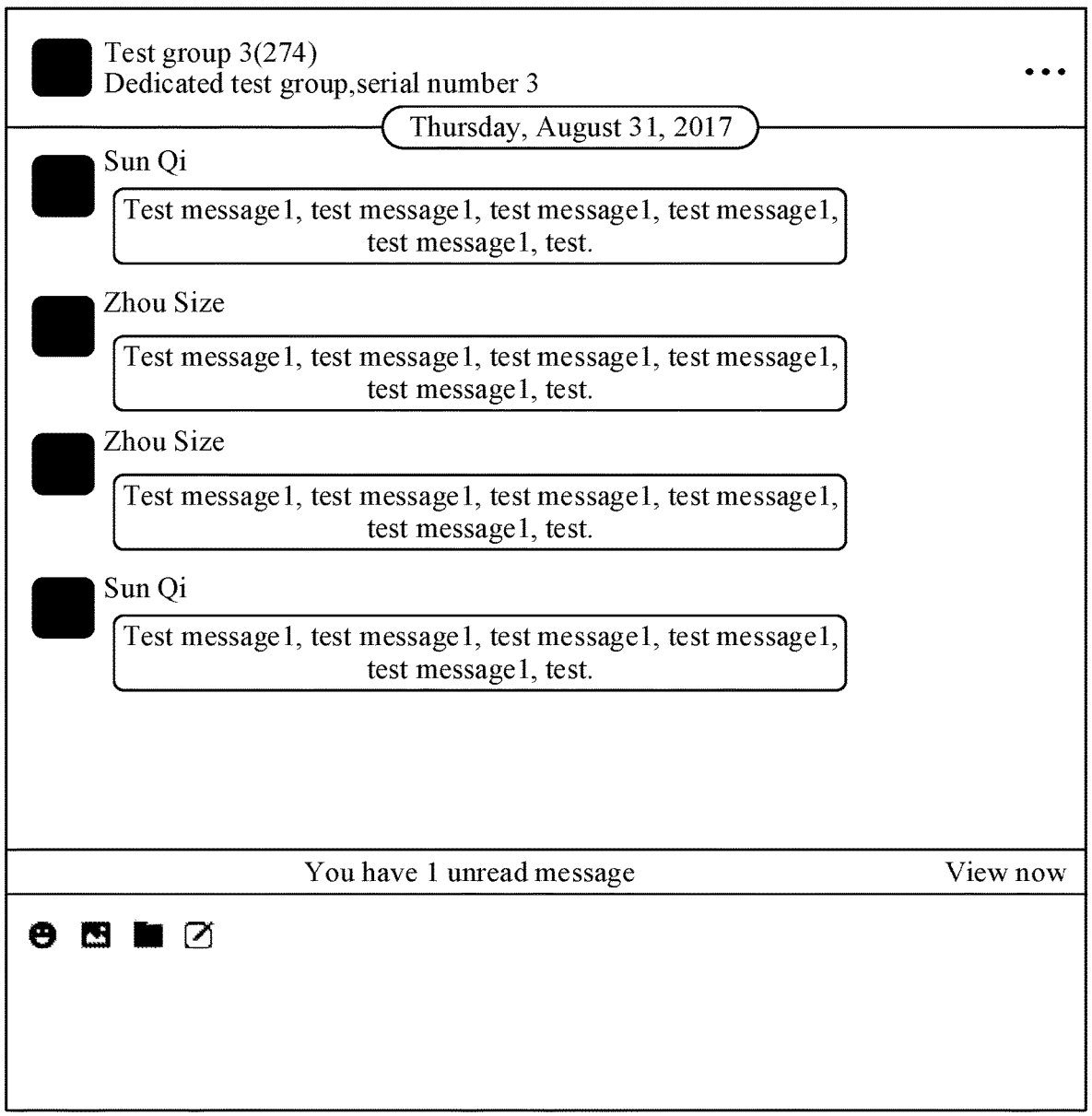
FIG. 2 is a display diagram of an unread-message reminder icon according to embodiment one of the present disclosure.

In an embodiment, the activation instruction of the session interface refers to the opening instruction of the session interface. For example, if a user opens the session interface of a session with Zhang San, the session interface of the session with Zhang San is activated. If Zhang San sends a lot of messages to the user before the activation, then when the user activates the session interface of the session with Zhang San, an unread-message reminder icon is displayed on the session interface, and the unread-message reminder icon displays, in real time, the total number of unread messages accumulating between the user and Zhang San. Referring to FIG. 2, a display diagram of an unread-message reminder icon, when the user taps the icon "view now", the first unread message is skipped to.

Exemplarily, the step in which an unread-message reminder icon is displayed on the session interface in response to receiving an activation instruction of a session interface and in the case where an unread message is present on the session interface includes that a reminder icon directed at a set type of unread message is displayed on the session interface in response to receiving the activation instruction of the session interface and in the case where the unread message present on the session interface includes the set type of unread message.

Figure 3:
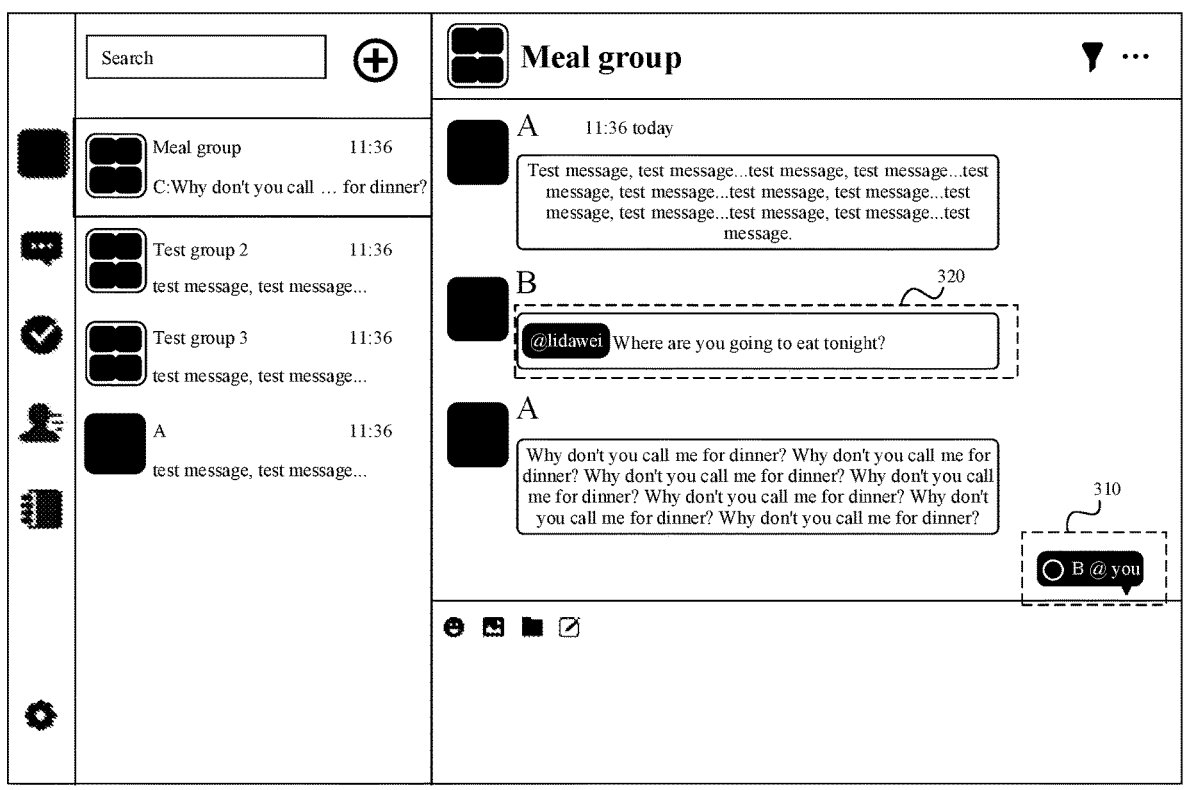
FIG. 3 is a display diagram of another unread-message reminder icon according to embodiment one of the present disclosure.
Figure 4:
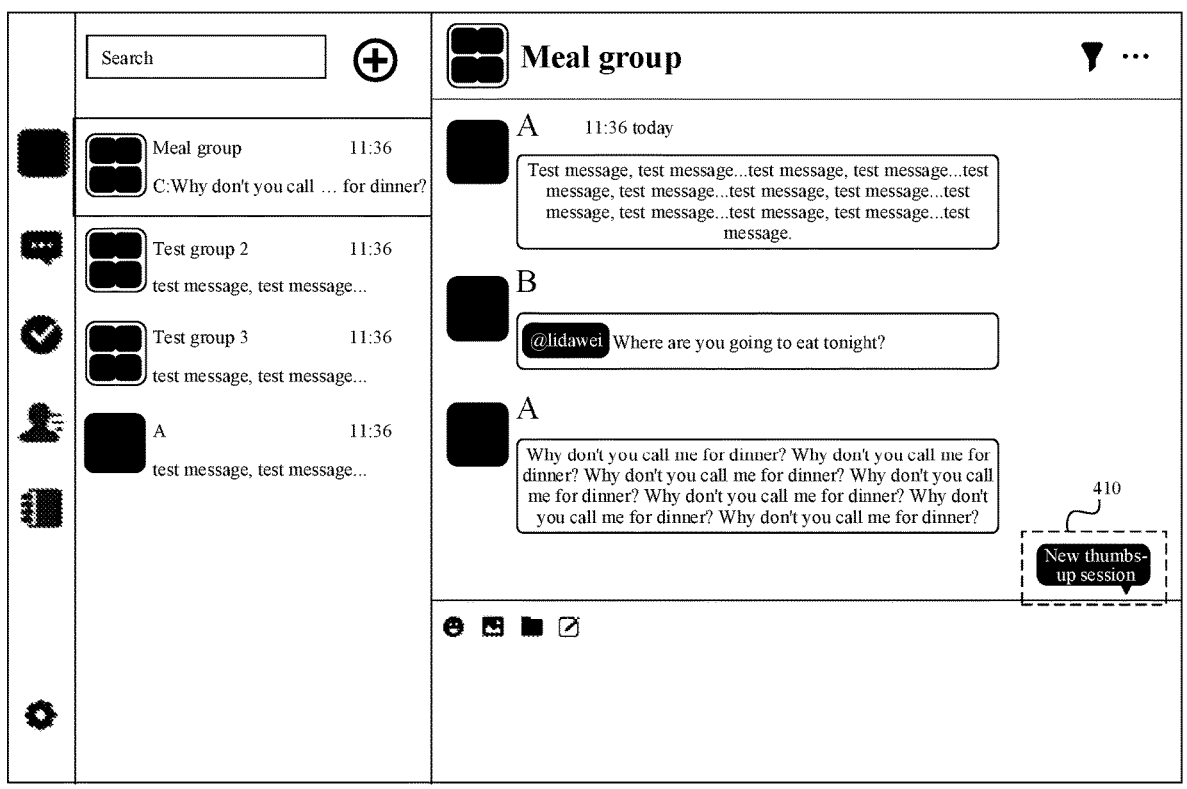
FIG. 4 is a display diagram of another unread-message reminder icon according to embodiment one of the present disclosure.

In an embodiment, the set type of unread message includes a mentioning message (that is, an @ message), a reply message or a thumbs-up message. Referring to FIGS. 3 and 4, display diagrams of other unread-message reminder icons, when the unread message includes an unread @ message or an unread thumbs-up message, the bubble reminder icon 310 directed at the @ message and the bubble reminder icon 410 directed at the thumbs-up message are displayed on the session interface.

In step 120, in response to receiving a trigger instruction of the unread-message reminder icon, a corresponding unread message is skipped to for a user to read.

In an embodiment, in response to receiving a trigger instruction of the unread-message reminder icon, the first unread message is skipped to so that the user can read all the unread messages sequentially. The unread message is positioned in this manner. This skipping mechanism is more suitable for the user reading habit. For example, as shown in FIG. 2, when the user taps the icon "view now", the first unread message is skipped to.

In an embodiment, if the unread-message reminder icon is used for reminding the user to view the set type of unread message, for example, an unread @ message, a reply message or a thumbs-up message, then when the trigger instruction of the unread-message reminder icon is received, the corresponding set type of unread message is skipped to so that the user can preferentially view this set type of unread message. The set type of unread message is not necessarily the type of the first unread message. The set type of unread message is more significant to the user than a non-set type of unread message. The user generally wishes to preferentially read the set type of unread message. For example, referring to FIG. 3, when the user taps the reminder icon 310, the corresponding set type of unread message 320 is skipped to. That is, the set type of unread message is skipped to in response to receiving the trigger instruction of the reminder icon directed at the set type of unread message.

Exemplarily, the step in which a corresponding unread message is skipped to includes that the corresponding unread message is displayed at a set position of the display area of the session interface; and unread messages other than the corresponding unread message are sequentially displayed, according to the size of the display area of the session interface, at a position that is located in the display area of the session interface and that is not the set position.

In an embodiment, the set position of the display area of the session interface may refer to a position that is 20 pixels away from the top of the display area of the session interface, and the previous message of the corresponding unread message may be displayed in the area between the top of the display area of the session interface and the set position. For example, if the corresponding unread message is the first unread message, then the previous message of the first unread message, that is, the last message of already-read messages may be displayed in the area between the top of the display area of the session interface and the set position. In this manner, the user can see at least the bottom boundary of the last read message and thereby can link up already-read messages and unread messages accurately. This design mode brings about a better user experience.

The step in which unread messages other than the corresponding unread message are sequentially displayed, according to the size of the display area of the session interface, at a position that is located in the display area of the session interface and that is not the set position may include that unread messages are sequentially displayed according to the reception time of the unread messages; and unread messages not displayed in the display area are sequentially displayed in the display area according to the sliding instruction triggered by the user so that the user can read these unread messages.

In step 130, the unread-message reminder icon displayed on the session interface is updated in real time and according to a session message received by the session interface in real time and an unread-message reading state.

In an embodiment, each time the user reads an unread message, the total number of unread messages displayed by the unread-message reminder icon is reduced by one; and each time the user receives an unread message, the total number of unread messages displayed by the unread-message reminder icon is increased by one. That is, unread messages are reminded about in real time. When the user triggers the unread-message reminder icon and the corresponding unread message is automatically skipped to, the unread-message reminder icon does not disappear, but the remaining unread messages are reminded about and positioned in real time according to the user's reading state and dynamically-received new session messages so that all the unread messages can be reminded about and positioned whenever the user opens the current session interface.

Exemplarily, the step in which the unread-message reminder icon displayed on the session interface is updated in real time and according to a session message received by the session interface in real time and an unread-message reading state includes that the total number of unread messages in the unread-message reminder icon is reduced by one in response to detecting that an unread message is displayed in a display area of the session interface; and the total number of unread messages in the unread-message reminder icon is increased by one in response to detecting that the session interface receives a session message not displayed in the display area of the session interface.

In the solution according to this embodiment of the present disclosure, in response to receiving the trigger instruction of the unread-message reminder icon, the corresponding unread message is skipped to; and before the user finishes reading all the currently unread messages, the unread-message reminder icon does not disappear and is always displayed on the current session interface, and the total number of unread messages is updated in real time according to the session message received by the session interface in real time and the unread-message reading state. In this manner, real-time reminding and positioning of unread messages are implemented, and thereby the user experience is improved.

Embodiment Two

Figure 5:
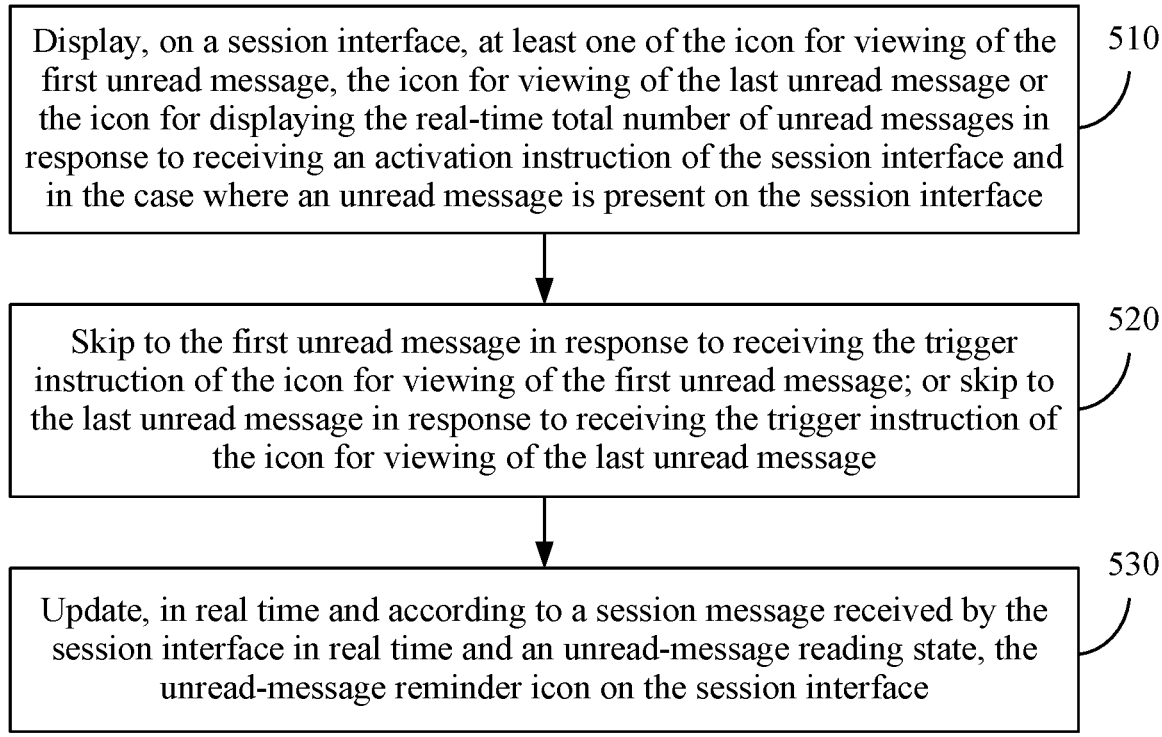
FIG. 5 is a flowchart of an unread-message reminding method according to embodiment two of the present disclosure.

FIG. 5 is a flowchart of an unread-message reminding method according to embodiment two of the present disclosure. This embodiment of the present disclosure is described based on the multiple optional schemes in the preceding embodiment. This embodiment provides a solution in which all unread messages are reminded about when unread messages are present both above and below the unread message being read by the user. Referring to FIG. 5, the unread-message reminding method includes the steps below.

In step 510, at least one of the icon for viewing of the first unread message, the icon for viewing of the last unread message or the icon for displaying the real-time total number of unread messages is displayed on a session interface in response to receiving an activation instruction of the session interface and in the case where an unread message is present on the session interface.

In an embodiment, an unread message is placed in an unread-message queue according to the time when the unread message is received in the session interface; and among all the unread messages, the earliest received message is the first unread message, and the last received message is the last unread message. For example, there are five unread messages in total. Assuming that unread message 1 is received in the session interface at 10:00 this morning, unread message 2 is received in the session interface at 10:01 this morning, unread message 3 is received in the session interface at 10:02 this morning, unread message 4 is received in the session interface at 10:03 this morning, and unread message 5 is received in the session interface at 10:04 this morning, then unread message 1 is the first unread message, and unread message 5 is the last unread message.

Figure 6:
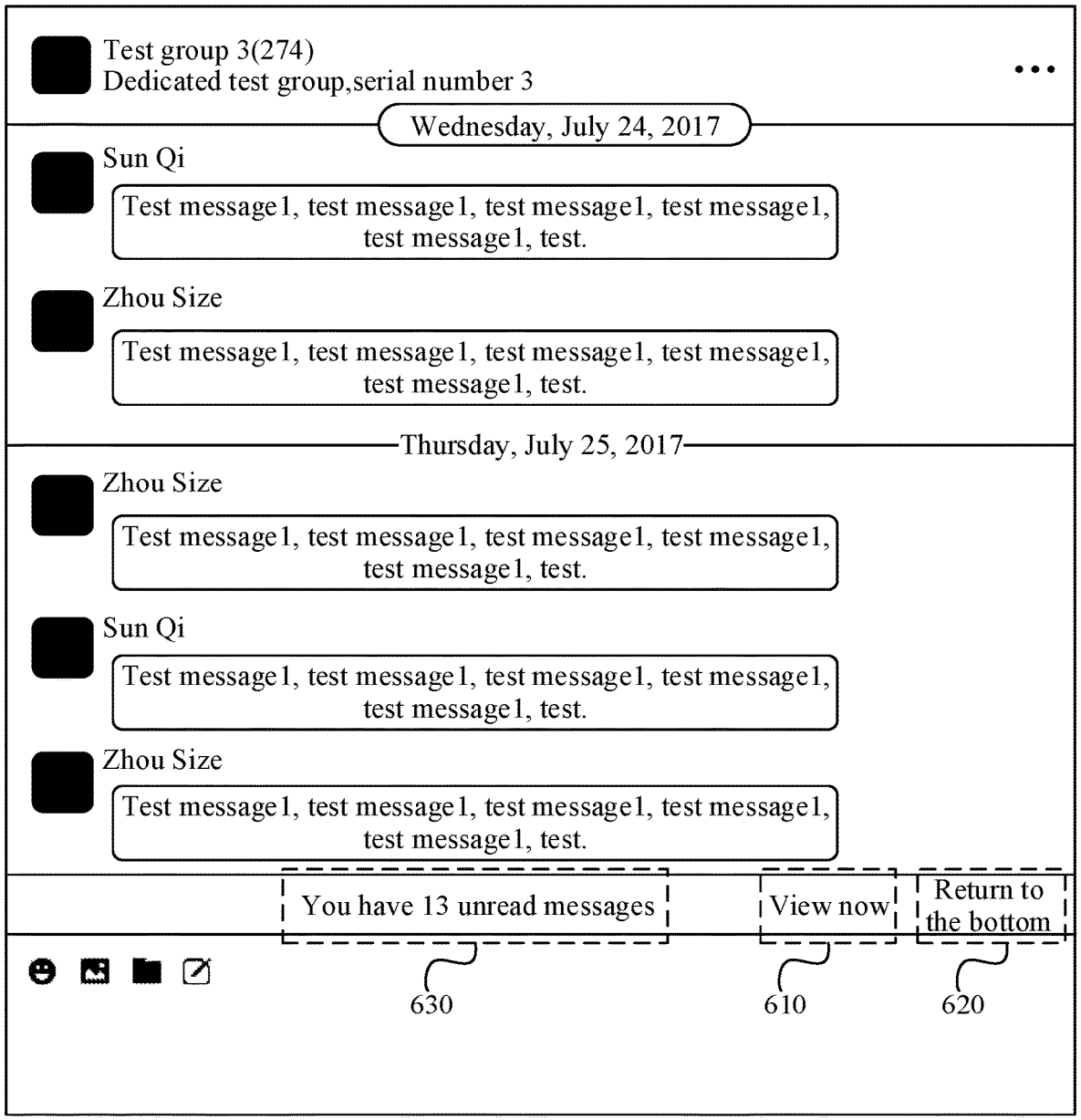
FIG. 6 is a display diagram of an unread-message reminder icon according to embodiment two of the present disclosure.

Referring to FIG. 6, the unread-message reminder icon includes the icon 610 for viewing of the first unread message, the icon 620 for viewing of the last unread message and the icon 630 for displaying the real-time total number of unread messages.

For example, when a group member in the current group session mentions (@) the user, the system automatically displays the bubble reminder icon of "XX @ you". After seeing the bubble reminder icon, the user tends to preferentially trigger the bubble reminder icon of "XX @ you" to read the unread message. When the user triggers the bubble reminder icon of "XX @ you", the system automatically skips to the unread message of "XX @ you", that is, the unread message of "XX @ you" is displayed in the display area of the current session interface. When the unread message of "XX @ you" is neither the first of all the current unread messages nor the last of all the current unread messages, unread messages are present both above and below the unread message of "XX @ you". At this time, the user can position and read the first unread message by triggering the icon 610 for viewing of the first unread message and can position and read the last unread message by triggering the icon 620 for viewing of the last unread message. The user can position and read the first unread message and the last unread message without manually sliding the screen, thereby improving the operation efficiency of the user.

In step 520, the first unread message is skipped to in response to receiving the trigger instruction of the icon for viewing of the first unread message; or the last unread message is skipped to in response to receiving the trigger instruction of the icon for viewing of the last unread message.

In step 530, the unread-message reminder icon displayed on the session interface is updated in real time and according to a session message received by the session interface in real time and an unread-message reading state.

In the solution according to this embodiment of the present disclosure, based on the preceding embodiment, when the unread message being read by the user is in the middle of all the unread messages, the first unread message can be positioned through the icon "view now", and the last unread message can be positioned through the icon "return to the bottom". In this manner, the operation efficiency of the user is improved.

Embodiment Three

Figure 7:
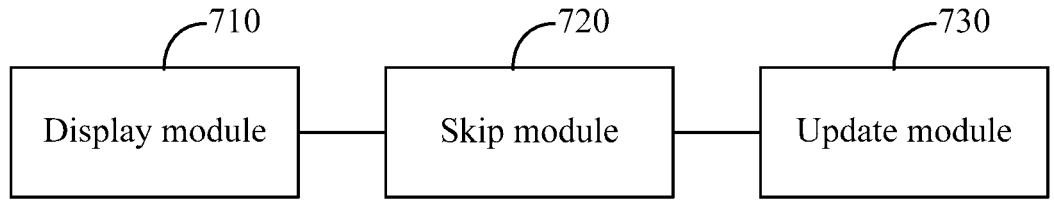
FIG. 7 is a diagram illustrating the structure of an unread-message reminder apparatus according to embodiment three of the present disclosure.

FIG. 7 is a diagram illustrating the structure of an unread-message reminder apparatus according to embodiment three of the present disclosure. As shown in FIG. 7, the unread-message reminder apparatus includes a display module 710, a skip module 720 and an update module 730. The display module 710 is configured to display, in response to receiving an activation instruction of a session interface and in the case where an unread message is present on the session interface, an unread-message reminder icon on the session interface. The skip module 720 is configured to skip, in response to receiving a trigger instruction of the unread-message reminder icon, to a corresponding unread message for a user to read. The update module 730 is configured to update, in real time and according to a session message received by the session interface in real time and an unread-message reading state, the unread-message reminder icon displayed on the session interface.

In an embodiment, the update module 730 is configured to reduce, in response to detecting that an unread message is displayed in a display area of the session interface, the total number of unread messages in the unread-message reminder icon by one; and increase, in response to detecting that the session interface receives a session message not displayed in the display area of the session interface, the total number of unread messages in the unread-message reminder icon by one.

In an embodiment, the skip module 720 is configured to skip to the corresponding unread message by displaying the corresponding unread message at a set position of the display area of the session interface; and sequentially displaying, according to the size of the display area of the session interface, unread messages other than the corresponding unread message at a position that is located in the display area of the session interface and that is not the set position.

In an embodiment, the display module 710 is configured to display, in response to receiving the activation instruction of the session interface and in the case where the unread message present on the session interface includes a set type of unread message, a reminder icon directed at the set type of unread message, where the set type of unread message includes a mentioning message or a reply message.

In an embodiment, the skip module 720 is configured to skip, in response to receiving the trigger instruction of the reminder icon directed at the set type of unread message, to the set type of unread message.

In an embodiment, the display module 710 is configured to display the unread-message reminder icon on the session interface by displaying the unread-message reminder icon on the session interface in the following manner: At least one of the icon for viewing of the first unread message, the icon for viewing of the last unread message or the icon for displaying the real-time total number of unread messages is displayed on the session interface.

In an embodiment, the skip module 720 is configured to skip, in response to receiving the trigger instruction of the icon for viewing of the first unread message, to the first unread message; and skip, in response to receiving the trigger instruction of the icon for viewing of the last unread message, to the last unread message.

In the solution according to this embodiment of the present disclosure, in response to receiving the trigger instruction of the unread-message reminder icon, the corresponding unread message is skipped to; and before the user finishes reading all the currently unread messages, the unread-message reminder icon does not disappear and is always displayed on the current session interface, and the total number of unread messages is updated in real time according to the session message received by the session interface in real time and the unread-message reading state. In this manner, real-time reminding and positioning of unread messages are implemented, and thereby the user experience is improved.

The preceding product can perform the method according to any embodiment of the present disclosure and has function modules corresponding to the performed method.

Embodiment Four

Figure 8:
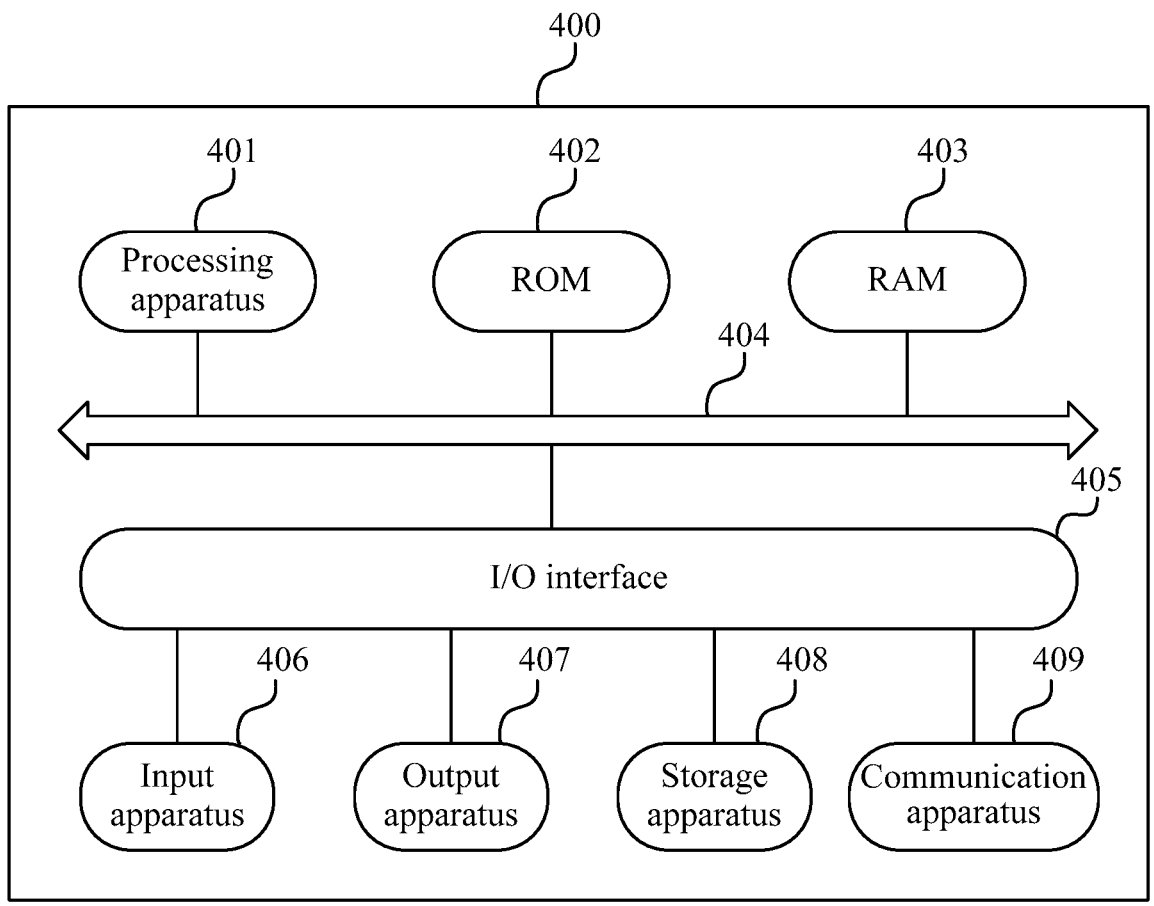
FIG. 8 is a diagram illustrating a hardware structure of a terminal device according to embodiment four of the present disclosure.

FIG. 8 is a diagram illustrating the structure of a terminal device 400 suitable for implementing embodiments of the present disclosure. The terminal device in each embodiment of the present disclosure may include, but is not limited to, a mobile terminal such as a mobile phone, a notebook computer, a digital broadcast receiver, a personal digital assistant (PDA), a portable android device (PAD), a portable media player (PMP) or a vehicle-mounted terminal (for example, a vehicle-mounted navigation terminal) or a fixed terminal such as a digital television (TV) or a desktop computer. The terminal device shown in FIG. 8 is merely an example not intended to limit the functionality and scope of use of embodiments of the present disclosure.

As shown in FIG. 8, the terminal device 400 may include a processing apparatus (for example, a central processing unit or a graphics processing unit) 401. The processing apparatus may execute multiple appropriate actions and processing according to programs stored in a read-only memory (ROM) 402 or programs loaded into a random access memory (RAM) 403 from the storage apparatus 408. The RAM 403 may also store various programs and data required for operations of the terminal device 400. The processing apparatus 401, the ROM 402 and the RAM 403 are connected to each other by a bus 404. An input/output (I/O) interface 405 is also connected to the bus 404.

Generally, devices that can be connected to the I/O interface 405 include an input apparatus 406 such as a touch screen, a touch pad, a keyboard, a mouse, a camera, a microphone, an accelerometer and a gyroscope; an output apparatus 407 such as a liquid crystal display (LCD), a speaker and a vibrator; the storage apparatus 408 such as a magnetic tape and a hard disk; and a communication apparatus 409. The communication apparatus 409 may allow the terminal device 400 to wirelessly or wiredly communicate with other devices to exchange data. Although FIG. 8 shows that the terminal device 400 has various apparatuses, it is to be understood that the terminal device 400 is not required to implement or have all of the apparatuses shown. The terminal device 400 may alternatively implement or have more or fewer apparatuses.

According to embodiments of the present disclosure, the process described earlier with reference to a flowchart may be implemented as a computer software program. For example, this embodiment of the present disclosure includes a computer program product. The computer program product includes a computer program carried in a computer-readable medium. The computer program contains program codes for implementation of the method shown in the flowchart. In such an embodiment, the computer program may be downloaded and installed from the network through the communication apparatus 409, installed from the storage apparatus 408, or installed from the ROM 402. When the computer program is executed by the processing apparatus 401, the functions defined in the method of any one of embodiments of the present disclosure are performed.

The computer-readable medium described earlier in the present disclosure may be a computer-readable signal medium, a computer-readable storage medium or a combination of any of the two. The computer-readable storage medium may be, for example, but not limited to, an electrical, magnetic, optical, electromagnetic, infrared or semiconductor system, device or element, or a combination of any of the preceding. More examples of the computer-readable storage medium may include, but are not limited to, an electrical connection having one or more wires, a portable computer disk, a hard disk, a RAM, a ROM, an erasable programmable read-only memory (EPROM), an optical fiber, a compact disc read-only memory (CD-ROM), an optical storage device, a magnetic storage device, or a suitable combination of any of the preceding. In the present disclosure, the computer-readable storage medium may be any tangible medium containing or storing a program that may be used by or used in connection with an instruction execution system, device or element. In the present disclosure, the computer-readable signal medium may include a data signal propagated as part of a carrier wave or in a baseband, and the computer-readable signal medium carries computer-readable program codes. Such propagated data signal may take a variety of forms including, but not limited to, an electromagnetic signal, an optical signal, or a suitable combination of any of the preceding. The computer-readable signal medium may also be any computer-readable medium other than a computer-readable storage medium. The computer-readable signal medium may send, propagate or transmit a program that may be used by or used in connection with an instruction execution system, device or element. The program codes included in the computer-readable medium may be transmitted using any suitable medium including, but not the preceding.

The computer-readable medium may be included in the terminal device or may be present alone and not mounted in the terminal device.

The preceding computer-readable medium carries one or more programs. When executed by the terminal device, the one or more programs cause the terminal device to display, in response to receiving an activation instruction of a session interface and in the case where an unread message is present on the session interface, an unread-message reminder icon on the session interface; skip, in response to receiving a trigger instruction of the unread-message reminder icon, to a corresponding unread message for a user to read; and update, in real time and according to a session message received by the session interface in real time and an unread-message reading state, the unread-message reminder icon displayed on the session interface.

Computer program codes for implementation of the operations of the present disclosure may be written in one or more programming languages or in a combination of multiple programming languages. The languages include object-oriented programming languages such as Java, Smalltalk and C++ or conventional procedural programming languages such as or "C" language or a similar programming language. The program codes may be executed entirely on a user computer, partly on the user computer, as a separate software package, partly on the user computer and partly on a remote computer, or entirely on the remote computer or a service server. In the case involving the remote computer, the remote computer may be connected to the user computer through any type of network including a local area network (LAN) or a wide area network (WAN) or may be connected to an external computer (by using, for example, the Internet of an Internet service provider).

Flowcharts and block diagrams in the drawings illustrate architectures, functions and operations of possible implementations of methods and computer program products according to embodiments of the present disclosure. In this regard, each block in the flowcharts or the block diagrams may represent a module, a program segment, or a part of codes that contain one or more executable instructions for implementing a specified logical function. It is to be noted that in some implementations as alternatives, the functions noted in the blocks may be implemented in a different order than the order noted in the drawings. For example, two successively presented blocks may actually be executed substantially in parallel and may sometimes be executed in the reverse order, depending on the functions involved. Each block of the block diagrams and/or the flowcharts and a combination of blocks in the block diagrams and/or the flowcharts may be implemented by a dedicated hardware-based system for performing specified functions or operations or may be implemented by a combination of dedicated hardware and computer instructions. The modules or units described in embodiments of the present disclosure may be implemented by software or hardware. The name of a module or unit does not limit the module or unit in some cases.

What is claimed is:

1. An unread-message reminding method, comprising:
   in response to an opening instruction for a session, displaying a session interface and displaying an unread-message reminder icon on the session interface in a case where a plurality of unread messages for the session exist, wherein displaying the unread-message reminder icon on the session interface comprises displaying a reminder icon for a set type of unread messages on the session interface in a case where the unread messages comprise the set type of unread messages, wherein the session interface is an interface for sending or receiving chat messages in an instant communication application, the unread messages are received chat messages that are not displayed on the session interface, and the set type of unread messages comprises at least one of the following: unread messages mentioning a current user, or unread reply messages to a message sent by the current user;
   in response to receiving a click instruction of the reminder icon for the set type of unread messages, displaying the set type of unread messages, wherein in a case where an unread message of the set type not displayed on the session interface exists, the reminder icon for the set type of unread messages does not disappear; and
   in response to receiving another click instruction of a reminder icon for the set type of unread messages, displaying, on the session interface, the unread message of the set type not displayed on the session interface.

2. The method of claim 1, further comprising: updating, in real time and according to a session message received by the session interface in real time and an unread-message reading state, the unread-message reminder icon displayed on the session interface, which comprises:
   reducing, in response to detecting that an unread message is displayed in a display area of the session interface, a total number of unread messages in the unread-message reminder icon by one; and
   increasing, in response to detecting that the session interface receives a session message not displayed in the display area of the session interface, the total number of unread messages in the unread-message reminder icon by one.

3. The method of claim 2, wherein displaying the unread-message reminder icon on the session interface comprises:
   displaying, on the session interface, at least one of an icon for viewing of a first unread message, an icon for viewing of a last unread message or an icon for displaying a real-time total number of unread messages.

4. The method of claim 1, wherein displaying the unread-message reminder icon on the session interface comprises:
   displaying, on the session interface, at least one of an icon for viewing of a first unread message, an icon for viewing of a last unread message or an icon for displaying a real-time total number of unread messages.

5. The method of claim 4, further comprising:
   in response to receiving the trigger instruction of the icon for viewing of the first unread message, displaying the first unread message at a set position of the display area of the session interface; or in response to receiving the trigger instruction of the icon for viewing of the last unread message, displaying the last unread message at a set position of the display area of the session interface.

6. The method of claim 1, further comprising: after displaying the set type of unread-messages on the session interface, in response to a click instruction of the unread-message reminder icon, displaying, on the session interface, other messages except the set type of unread messages.

7. The method of claim 1, further comprising:
   in response to receiving a trigger instruction of the unread-message reminder icon, displaying a corresponding unread message at a set position of the display area of the session interface; and sequentially displaying, according to a size of the display area of the session interface, unread messages other than the corresponding unread message at a position that is located in the display area of the session interface and that is not the set position.

8. The method of claim 7, further comprising:

in response to receiving another trigger instruction of the unread-message reminder icon, displaying a corresponding next unread message at the set position of the display area of the session interface.

9. A terminal device, comprising:

at least one processing apparatus; and a storage apparatus storing at least one program, wherein the at least one program, when executed by the at least one processing apparatus, causes the at least one processing apparatus to perform the following steps:

in response to an opening instruction for a session, displaying a session interface and displaying an unread-message reminder icon on the session interface in a case where a plurality of unread messages for the session exist, wherein displaying the unread-message reminder icon on the session interface comprises displaying a reminder icon for a set type of unread messages on the session interface in a case where the unread messages comprise the set type of unread messages, wherein the session interface is an interface for sending or receiving chat messages in an instant communication application, the unread messages are received chat messages that are not displayed on the session interface, and the set type of unread messages comprises at least one of the following: unread messages mentioning a current user, or unread reply messages to a message sent by the current user;

in response to receiving a click instruction of the reminder icon for the set type of unread messages, displaying the set type of unread messages, wherein in a case where an unread message of the set type not displayed on the session interface exists, the reminder icon for the set type of unread messages does not disappear; and in response to receiving another click instruction of a reminder icon for the set type of unread messages, displaying, on the session interface, the unread message of the set type not displayed on the session interface.

10. The terminal device of claim 9, wherein the at least one program, when executed by the at least one processing apparatus, further causes the at least one processing apparatus to perform updating, in real time and according to a session message received by the session interface in real time and an unread-message reading state, the unread-message reminder icon displayed on the session interface by:

reducing, in response to detecting that an unread message is displayed in a display area of the session interface, a total number of unread messages in the unread-message reminder icon by one; and increasing, in response to detecting that the session interface receives a session message not displayed in the display area of the session interface, the total number of unread messages in the unread-message reminder icon by one.

11. The device of claim 10, wherein displaying the unread-message reminder icon on the session interface comprises:

displaying, on the session interface, at least one of an icon for viewing of a first unread message, an icon for viewing of a last unread message or an icon for displaying a real-time total number of unread messages.

12. The device of claim 9, wherein displaying the unread-message reminder icon on the session interface comprises:

displaying, on the session interface, at least one of an icon for viewing of a first unread message, an icon for viewing of a last unread message or an icon for displaying a real-time total number of unread messages.

13. The device of claim 12, wherein the at least one program, when executed by the at least one processing apparatus, further causes the at least one processing apparatus to perform the following step:

in response to receiving the trigger instruction of the icon for viewing of the first unread message, displaying the first unread message at a set position of the display area of the session interface; or in response to receiving the trigger instruction of the icon for viewing of the last unread message, displaying the last unread message at a set position of the display area of the session interface.

14. The device of claim 9, wherein the at least one program, when executed by the at least one processing apparatus, further causes the at least one processing apparatus to perform the following step:

after displaying the set type of unread messages on the session interface, in response to a click instruction of the unread-message reminder icon, displaying, on the session interface, other messages except the set type of unread messages.

15. The device of claim 9, wherein the at least one program, when executed by the at least one processing apparatus, further causes the at least one processing apparatus to perform the following step:

in response to receiving a trigger instruction of the unread-message reminder icon, displaying a corresponding unread message at a set position of the display area of the session interface; and sequentially displaying, according to a size of the display area of the session interface, unread messages other than the corresponding unread message at a position that is located in the display area of the session interface and that is not the set position.

16. The device of claim 15, wherein the at least one program, when executed by the at least one processing apparatus, further causes the at least one processing apparatus to perform the following step:

in response to receiving another trigger instruction of the unread-message reminder icon, displaying a corresponding next unread message at the set position of the display area of the session interface.

17. A non-transitory computer-readable storage medium, storing a computer program which, when executed by a processing apparatus, causes the processing apparatus to perform the following steps:

in response to an opening instruction for a session, displaying a session interface and displaying an unread-message reminder icon on the session interface in a case where a plurality of unread messages for the session exist, wherein displaying the unread-message reminder icon on the session interface comprises displaying a reminder icon for a set type of unread messages on the session interface in a case where a the unread messages comprise the set type of unread messages, wherein the session interface is an interface for sending or receiving chat messages in an instant communication application, the unread messages are received chat messages that are not displayed on the session interface, and the set type of unread messages comprises at least one of the following: unread messages mentioning a current user, or unread reply messages to a message sent by the current user;

in response to receiving a click instruction of the reminder icon for the set type of unread messages, displaying the set type of unread messages, wherein in a case where an unread message of the set type not displayed on the session interface exists, the reminder icon for the set type of unread messages does not disappear; and in response to receiving another click instruction of a reminder icon for the set type of unread messages, displaying, on the session interface, the unread message of the set type not displayed on the session interface.

\* \* \* \* \*